US008564416B2

(12) United States Patent  (10) Patent No.: US 8,564,416 B2
Steven et al.  (45) Date of Patent: *Oct. 22, 2013

(54) SYSTEMS AND METHODS FOR AUTOMATED PROGRAMMING OF RFID TAGS USING MACHINE READABLE INDICIA

(75) Inventors: Tethrake M. Steven, Collierville, TN (US); Robert Varner, Germantown, TN (US); Jeffrey H Nycz, Collierville, TN (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 818 days.

This patent is subject to a terminal disclaimer.

(21) Appl. No.: 12/789,091

(22) Filed: May 27, 2010

(65) Prior Publication Data

US 2010/0238039 A1  Sep. 23, 2010

Related U.S. Application Data

(63) Continuation of application No. 11/341,488, filed on Jan. 30, 2006, now Pat. No. 7,772,964.

(51) Int. Cl.
*H04Q 5/22* (2006.01)
*G08B 13/14* (2006.01)
*G06K 7/10* (2006.01)
*B41J 11/44* (2006.01)

(52) U.S. Cl.
USPC ............ 340/10.51; 340/10.1; 340/10.52; 340/10.6; 340/572.1; 235/462.13; 235/472.01; 400/76

(58) Field of Classification Search
None
See application file for complete search history.

(56) References Cited

U.S. PATENT DOCUMENTS

| 5,382,784 | A | 1/1995 | Eberhardt |
| 6,262,671 | B1* | 7/2001 | Nakano ................. 340/7.2 |
| 6,598,800 | B1 | 7/2003 | Schmit et al. |
| 6,758,403 | B1* | 7/2004 | Keys et al. ............. 235/462.45 |
| 7,055,750 | B2 | 6/2006 | Carrender |
| 2002/0074404 | A1* | 6/2002 | Drumm ................. 235/462.01 |
| 2004/0032443 | A1 | 2/2004 | Moylan et al. |
| 2004/0257203 | A1 | 12/2004 | Maltser et al. |
| 2005/0029350 | A1 | 2/2005 | Jusas et al. |
| 2005/0058483 | A1 | 3/2005 | Chapman et al. |
| 2005/0230478 | A1 | 10/2005 | Chapman et al. |
| 2005/0276647 | A1 | 12/2005 | Chapman et al. |

FOREIGN PATENT DOCUMENTS

| EP | 1394718 A2 | 3/2004 |
| WO | 0010122 | 2/2000 |
| WO | 2005111912 A1 | 11/2005 |

* cited by examiner

*Primary Examiner* — George Bugg
*Assistant Examiner* — Renee Dorsey

(57) ABSTRACT

Methods and systems for automatically programming an RFID tag using machine readable indicia. A dual mode device performs a bar code scan of a bar coded label. Information obtained from the bar code scan is stored. This information may be used to query a database indexed by the bar code information that contains detailed product information. The bar code information as well as the detailed information may be transmitted in an RF signal by the dual mode device to an RFID tag to be stored in a memory structure in the tag. The dual mode device may perform a read operation on the tag after the write operation to confirm that the data was successfully stored and provide an indication thereof. The indication may be a visual indication, a textual indication, an audible indication or combinations of these.

20 Claims, 4 Drawing Sheets

SYSTEMS AND METHODS FOR AUTOMATED PROGRAMMING OF RFID TAGS USING MACHINE READABLE INDICIA

CROSS REFERENCE TO RELATED APPLICATIONS

This application is a continuation of prior application Ser. No. 11/341,488, filed on Jan. 30, 2006.

FIELD OF THE INVENTION

Embodiments of the invention generally relate to radio frequency identification systems, and more particularly systems and methods for automated programming of RFID tags using a bar code reader to obtain tag input information. The systems and method of the various embodiments of the invention may be useful with a variety of different applications in which bar code labels exist or can be easily generated for items to be identified, thereby reducing errors associated with manual data input in programming RFID transponder tags.

DESCRIPTION OF RELATED ART

Radio frequency identification (RFID) systems use an RF field generator (reader) to wirelessly extract identification information (i.e., UPC, product name, etc.) contained in RFID transponder tags that are attached to various products and objects requiring accurate identification. RFID tags are miniature electronic circuits that typically consist of a coil that acts as an antenna and a small silicon-based microprocessor with a memory, all encapsulated in a protective material. RFID tags store identification information, usually in the form of an identification number, product name and/or other information that corresponds to an object or item to which the tag is attached. This number may be used to index a database containing price, product name, manufacture and/or other information. When a transponder tag enters an RF field generated by a reader device, the circuit of the tag becomes energized causing the processor to perform a data operation, usually by emitting a signal containing the processor's stored information. The basic structure and operation of RFID tags can be found in, for example, U.S. Pat. Nos. 4,075,632, 4,360, 801, 4,390,880, 4,739,328 and 5,030,807, the disclosures of which are hereby incorporated by reference in their entirety.

RFID tags generally are formed on a substrate, such as, for example, paper, and can include analog RF circuits, digital logic, and memory circuits. RFID tags also can include a number of discrete components, such as capacitors, transistors, and diodes. RFID tags are categorized as either active or passive. Active tags have their own discrete power source such as a battery. When an active tag enters an RF field it is turned on and then emits a signal containing its stored information. Passive tags do not contain a power source. Rather, they become inductively or capacitively charged when they enter an RF field. Once the RF field has activated the passive circuit, the tag emits a signal containing its stored information. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate to the RF signal to transmit the retrieved data. In addition to retrieving and transmitting data previously stored in the memory, both passive and active dynamic RFID tags can permit new or additional information to be written to a portion of the RFID tag's memory, or can permit the RFID tag to manipulate data or perform some additional functions.

Though originally invented to track feeding of cattle, RFID tags are today utilized in a variety of applications including retail security, inventory management, and even computerized checkout. With the price of RFID tags now reaching as low as 5 cents per tag, and because of reductions in size due to an overall trend towards miniaturization in circuit design, RFID tags currently are being applied to many types of products, both at the consumer level as well as in manufacturing processes. RFID tags enable manufacturers to wirelessly track products from the manufacturing stage to the point-of-sale. They provide a robust, cost effective, efficient and accurate solution to inventory tracking and management.

RFID tags are rapidly becoming the preferred method of inventory tracking in retail and distribution applications and will likely surpass bar codes as the preferred point-of-sale checkout identifier. Large retail chains such as WALMART Corporation are already requiring their suppliers to utilize RFID tags for tracking shipments. RFID tags have significant advantages over bar code labels. For example, bar codes are limited in size by resolution limitations of bar code scanners, and the amount of information that the symbols can contain is limited by the physical space constraints of the label. Therefore, some objects may be unable to accommodate bar code labels because of their size and physical configuration. In contrast, RFID tags store their information in digital memory. Thus, they can be made much smaller than bar code tags.

Another advantage of RFID tags over bar codes is that bar code readers requires line of sight in order to read the reflection pattern from a bar code. As labels become worn or damaged, they can no longer be read with the bar code scanner. Also, because a person operating the bar code scanner must physically orient either the scanner or the product to achieve line of sight on each item being scanned, items must be scanned one at a time resulting in prolonged scan time. RFID tags, on the other hand, are read through radio waves, which do no require line of sight because they are able to penetrate light impermeable materials. This not only eliminates the line of sight requirement, but also allows rapid identification of a batch of tagged products.

Yet another relative advantage of RFID tags over bar code labels is that for dynamic RFID tags, the information stored in the tag may be updated using a writing device to wirelessly transmit the new information to be stored. Updating information in bar code tags typically requires printing a new tag to replace the old.

As companies migrate from bar code technology to radio frequency identification techniques, they are faced with the problem of how to facilitate this transfer without introducing new human generated errors occurs. Many companies have large investments in computer software, bar code hardware and inventory management systems for creating and linking bar code labels. Such systems and well known and widely available in the market place. Many existing inventory management systems use bar code labeled indicia as a means of indexing detailed product information. For example, at the grocery store point of sale terminal a scan of the bar code returns a product price and description. This information is not stored in the tag, but rather stored in the inventory management system of the retail facility and indexed by the bar-coded UPC number.

Conventional bar code writing devices, that is, the devices used to program information into the memory structures of RFID transponder tags, usually rely on a keyboard device for a user to input information that is to be stored in the tag's memory. This process is not only time consuming but is also prone to introducing errors attributable to incorrect data entry. Alternatively, other conventional systems may allow the user to access a database either in an RFID reader device or externally accessible by such a device to select information on a product or other item to be written to tag. This method is also time consuming because the user must navigate through the available information to find a particular item. This method also requires the user to be familiar with products and their descriptions.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Based on the foregoing, there is a need for systems and methods of programming RFID transponder tags that are efficient, accurate and less reliant on manual data entry. It would be desirable to provide systems and methods for automatically programming RFID tags without reliance on manual data input that overcomes or ameliorates some or all of the shortcomings of conventional RFID tag programming systems and methods. In particular, it would be desirable to provide systems and methods for programming RFID tags with information obtained through machine reading, or more specifically through bar code reading techniques.

Thus, it is a feature of various embodiments of the invention to provide a method of converting bar coded information to RFID tag information using a dual function bar code reader RFID reader/writer to facilitate the data conversion.

Another feature of various embodiments of the invention provides a method of automatically programming an RFID tag using a machine readable data code as the data source for the RFID tag.

To achieve the above-noted features, and in accordance with the purposes as embodied and broadly described herein, one exemplary embodiment provides a method of programming an RFID tag. The method of programming an RFID tag according to this embodiment comprises reading a bar code label with a bar code reader, storing information read from the bar code label in a memory structure of a data processing system, transmitting a radio frequency signal including the stored information to an RFID tag, and storing the information contained in the radio frequency signal in a memory device in the RFID tag.

In accordance with another exemplary embodiment, a method of automatically programming an RFID tag is provided. The method of automatically programming an RFID tag according to this embodiment comprises scanning a bar code with a computing device to obtain information encoded therein, storing the obtained information in the computing device, transmitting a radio frequency signal from the computing device to an RFID tag that contains the obtained information, and storing the information received at the RFID tag in a memory structure in the tag.

In accordance with a further exemplary embodiment, a system for automated programming of RFID tags is provided. The system for automatic programming of RFID tags according to this embodiment comprises a dual purpose bar code scanner and RFID reader/writer device, and a series of computer readable instructions stored in the dual purpose device adapted to cause the device to perform a bar code scan operation of a bar code label, to store information obtained from the bar code scan operation, and write the stored information to an RFID transponder tag.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

Purposes and advantages of the embodiments will be apparent to those of ordinary skill in the art from the following detailed description in conjunction with the appended drawings in which like reference characters are used to indicate like elements, and in which.

DETAILED DESCRIPTION

The following description is intended to convey a thorough understanding of the embodiments described by providing a number of specific embodiments and details involving systems and methods of programming data to RFID transponder tags based on data read from bar coded labels. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As used herein, the expressions "RFID tag" and "RFID transponder tag" will refer to any active or passive type of electronic data storage device, read-only or read and write, that is wirelessly activated in the presence of a radio frequency (RF) field, including any currently available inductively coupled RFID tags, capacitively coupled RFID tags and even future RF-type tags not yet available. This includes tags operating in the 125 kHz, 13.56 MHz, 868-927 MHz, 2.45 GHz and 5.8 GHz frequency bands as well as other suitable frequency bands. Also, the tag may be a silicon-type IC tag, a printed tag printed with a conductive ink-based printing process or a tag formed by other suitable means.

As used herein, the terms "write" and "program" in the context of storing data to a memory structure contained in an RFID transponder tag circuit will be used synonymously to refer to the process of transmitting a radio frequency signal that has been modulated to contain identification information to be stored in the memory structure. The tag circuit includes an antenna, processor and memory structure. The tag circuit is able to receive the signal, recover the encoded information and store that information in the non-volatile memory structure so that it can be wirelessly accessed by RFID reader devices.

Through out this description, the expression "dual mode bar code reader and RFID reader/writer device" will be given broad meaning including, but not limited to, any type of handheld, portable, or stationary device consisting of a single unitary structure or separate structures in communication with one another, that is capable of reading a bar code label (typically by illuminating the label with a laser or other light source and translating the reflection pattern into a number), at least temporarily storing that information and transmitting a write signal to an RFID transponder tag containing the information so that the information can be stored in a memory structure in the RFID transponder tag.

Figure 1:
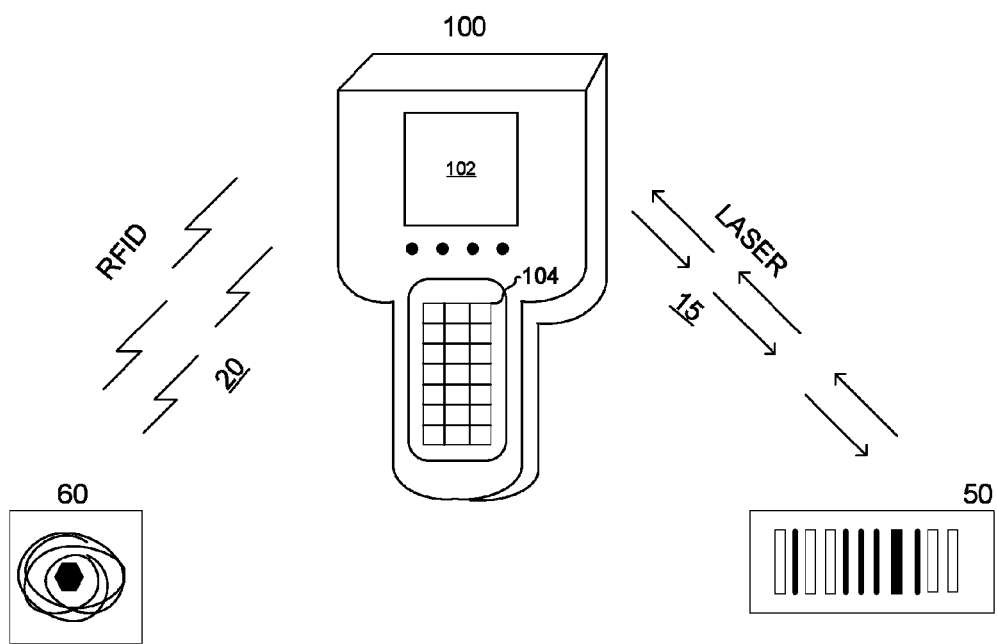
FIG. 1 is a perspective view of system for automatically writing data to an RFID tag based on data read from a bar code label in accordance with at least one embodiment of the invention.

Referring now to FIG. 1, a system for automatically writing data to an RFID tag based on data read from a bar code label in accordance with at least one embodiment of the invention is depicted. The system comprises a dual purpose bar code reader and RFID reader/writer device 100 having an integral bar code scanner that an operator can use to read a bar code label 50, store the coded information obtained from the bar code read operation, and then "write" that information to a memory structure contained in an RFID transponder tag 60. Though the device 100 shown in FIG. 1 is a unitary, hand-held device, it should be appreciated that the device 100 may be part of a distributed system or non-unitary system such as a desktop terminal with a wired or wireless bar code reader and a wired or wireless RFID reader/writer, both of which are in communication with the desktop terminal. The various embodiments of the invention are not dependent upon a particular configuration, but rather use an integrated control system that uses bar-coded information as the data source for an RFID transponder tag. In this way, errors associated with manual data entry may be reduced. In various embodiments, the device 100 may write the information obtained from scanning the bar code label 50 directly to the RFID transponder tag 60. In various embodiments, the device 100 may use the code information obtained from scanning the bar code label 50 to index a table and/or database containing more detailed information associated with code information and, write this detailed information as well as the code information to the RFID transponder tag 60. The detailed information may be stored in the device 100 or in an external database that is queried by the device 100 after performing the bar code scan operation. If the device 100 is stationary device such as stationary bench or work station, the user may merely move a bar code label 50 past the bar code reader and then place an RFID transponder tag 60 in a field area of the RFID writer to write the information to the tag. Such a workstation configuration may have particular utility in high throughput environments where RFID transponder tags need to be generated quickly based on bar code labels, such as, for example, in a manufacturing facility.

The device 100 depicted in FIG. 1 has a user interface comprising a screen 102 and keyboard 104 for input and output of operator information. However, it should be appreciated that the interface is exemplary only. Various embodiments, may only have a display screen, may have a touch enabled display screen, may have only a series of LEDs in lieu of a display screen or mixtures of the above. The various embodiments of the invention are not dependent upon the particular form of the interface. As discussed above, the form of the interface may be dependent in part of the form of the device itself, i.e., hand-held, unitary, multi-part system, desktop, workstation, etc. In various embodiments, control/operating system for the bar code reader and RFID reader/writer device will permit the user to configure features such as bar code symbology, type of data, length of bar-coded data, bar code check digit enable/disable, etc. In various embodiments, the control/operating system will allow the user to choose between a batch mode and real time mode of data collection and encoding the collected data to RFID tags. In various embodiments, the control/operating system will allow the operator to select a particular type of RFID tag from a variety of different tag types. In various embodiments, the control/operating system will allow the operator to select and/or configure the memory block scheme of the selected RFID tag. In various embodiments, a user may perform data synchronization between a hand held or portable terminal and a stationary PC or PC network, such as for example, through wireless or wire-based communication links.

Figure 2:
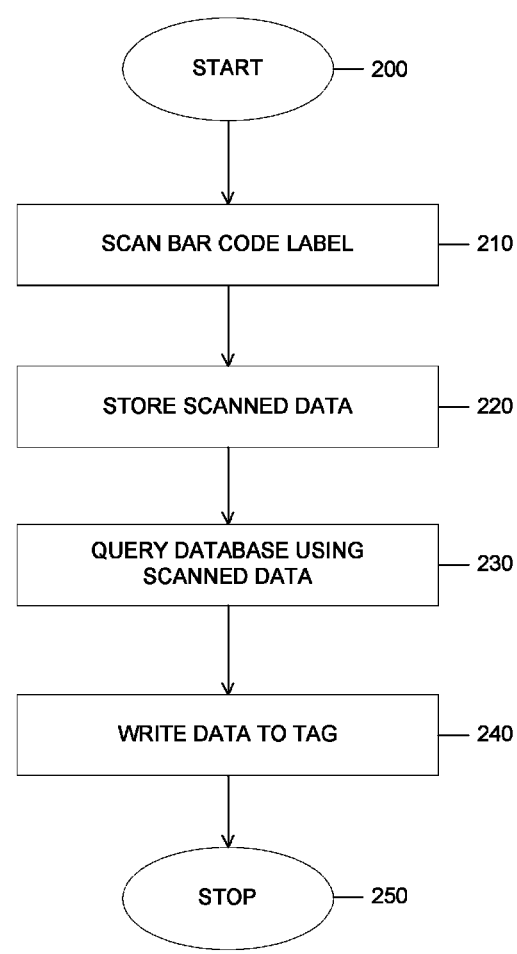
FIG. 2 is a flow chart detailing the steps of a method for programming an RFID tag with data read from a bar code label according to at least one embodiment of the invention.

Referring to FIG. 2, a flow chart detailing the steps of a method for programming an RFID tag with data read from a bar code label according to at least one embodiment of the invention is illustrated. The method begins in step 200 and proceeds to step 210 where the bar code label is scanned. In various embodiments, this may comprise a user depressing a button or other activator to cause a bar code read operation to occur an a bar code label. Alternatively, this may comprise moving the bar code label into the field of influence of an always on or motion activated bar code scanning field in a manner analogous to grocery store point-of-sale systems. Next, in step 220, the code information obtained during the scan step 210 is stored in a memory in communication with the bar code scanner. Then, in step 230, a database indexed by the code information is queried. As discussed above in the context of FIG. 1, this database may be located in a handheld scanner RFID reader/writer device, it may be located in a desktop system to which the bar code scanner is tether or remotely coupled to, or the database may even be remotely accessed through a bi-directional wireless or wire-based communication channel. In various embodiments, querying the database will return more detailed information such as item name, manufacturer, price, manufacture date, etc. As noted above, an advantage of RFID technology over bar codes is that the RFID tag may store more information because it is not limited by the same physical constraints as a bar code label. Thus, subsequent reads of the RFID tag may not require querying a product/inventory database because some or all of the information in such a database may be stored electronically in the tag itself. In various embodiments, the data obtained from querying the database is at least temporarily stored in a memory structure in communication with the scanner and RFID reader/writer device. Then, in step 240, some or all of this temporarily stored data is written to the RFID tag. As discussed herein, this is accomplished by modulating an RF signal to transmit the data. The data written to the tag, may in some embodiments, be only the code read from the tag, may in other embodiments be some or all of the detailed information obtained from querying the database, and in yet other embodiments, may be mixtures of both. In various embodiments the user may specify through an interface which of the available data fields should be written to the RFID tag.

Figure 3:
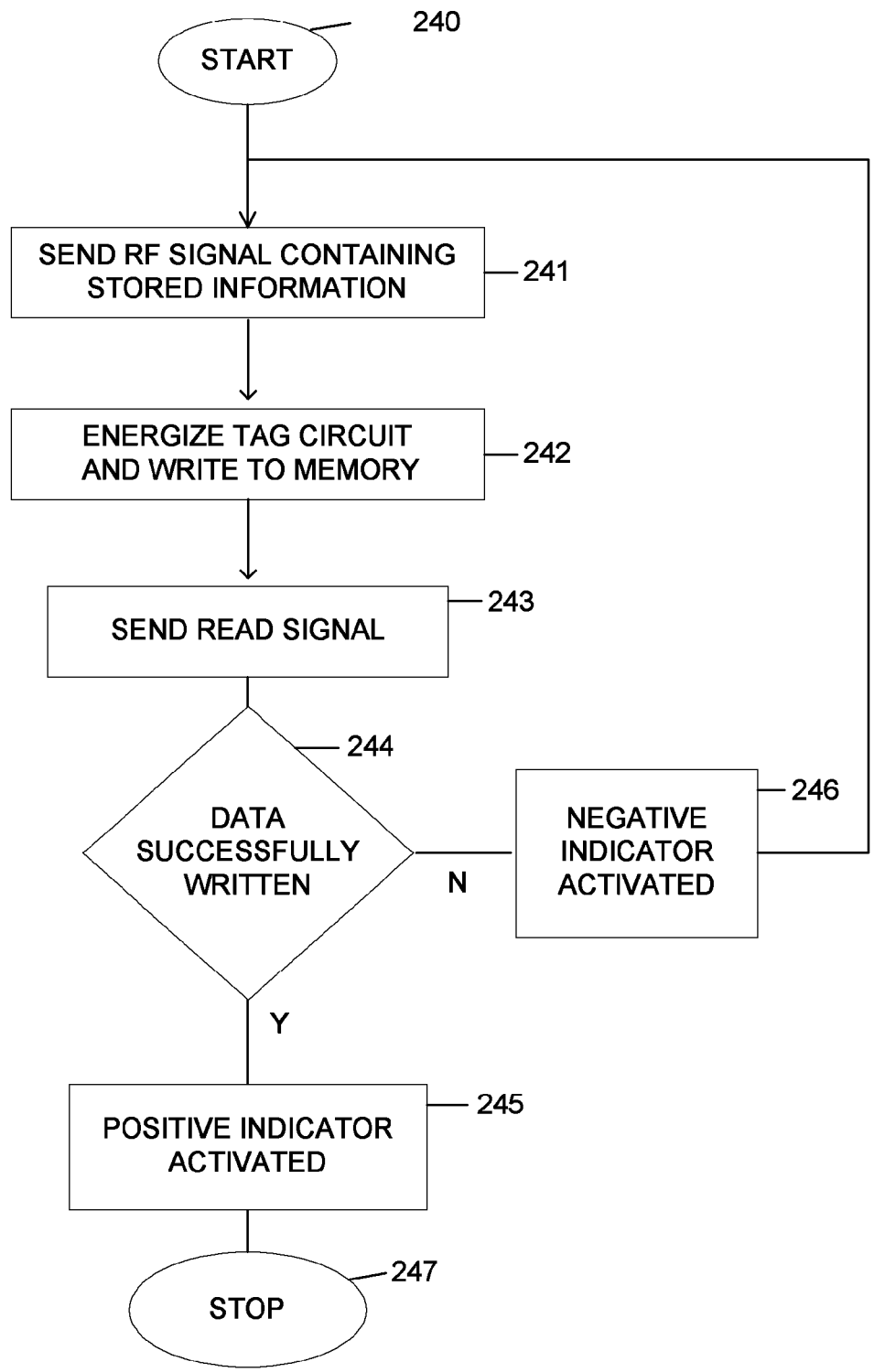
FIG. 3 is a flow chart detailing the steps of a method for writing data to an RFID tag according to at least one embodiment of the invention.

Referring now to FIG. 3, a flow chart detailing the steps of a method for writing data to an RFID tag according to at least one embodiment of the invention is depicted. The method begins in step 250 and proceeds to step 251 where an RF signal containing the information that is destined for the transponder tag is transmitted within a physical space containing the tag. This may comprise pointing a reader/writer device at the tag, or moving the tag into an area of RF influence created by the writer device. Then, in step 252, the tag circuit becomes energized by the RF field. This enables the processor in the tag circuit to issue a write command thereby storing the information in the tag's integral memory. Next, in step 243, in various embodiments, the system will perform a read operation. A read operation may comprise generating an RF field of sufficient strength and appropriate frequency to again energize the circuit in the transponder tag and cause it to emit a signal containing the stored information. In step 244, a determination is made whether the write operation was successful. In various embodiments, this may comprise comparing the information obtained from the read operation to the stored information that was written to the tag. If in step 244, it is determined that the data was written successfully, operation may advance to step 245. Otherwise, operation may go to step 246 where a negative indicator is activated. In various embodiments, this may comprise displaying a message, illuminating an LED or other light, outputting an audio message, or combinations of these. The user may be prompted to repeat the write operation causing system operation to go back to step 241. Alternatively, the system may automatically go to step 241 one or more times if the data is not written successfully. Returning to step 245, if in step 244 it is determined that the data was written successfully, a positive indicator may be activated. As with the activating the negative indicator in step 246, this may comprise displaying a message, illuminating an LED or other light, outputting an audio message, or combinations of these. Operation stops in step 247.

Figure 4:
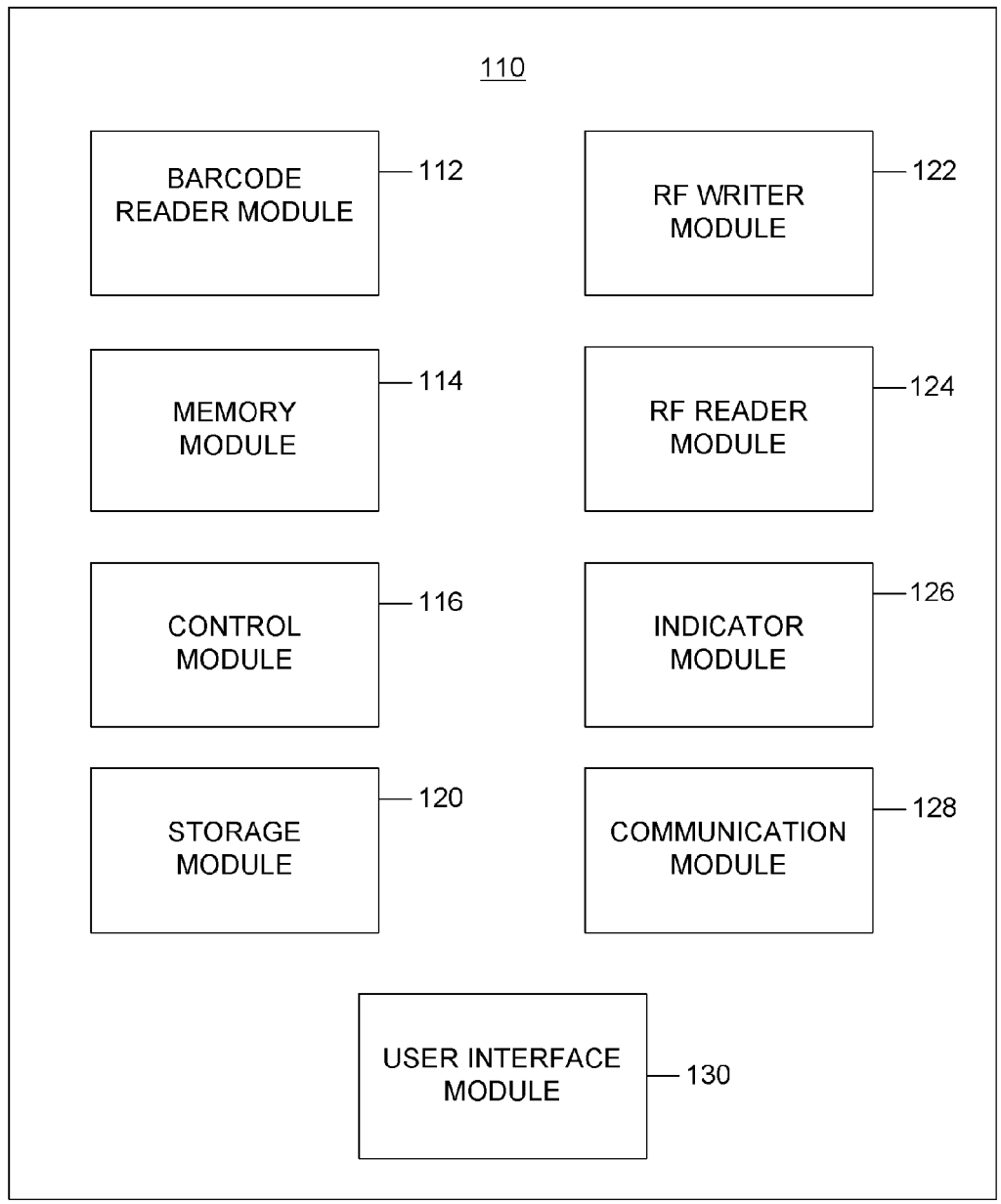
FIG. 4 is block diagram illustrating the modules of a control system for a dual function bar code reader and RFID reader/writer in accordance with at least one embodiment of the invention.

Referring now to FIG. 4, a block diagram illustrating the modules of a control system for a dual function bar code reader and RFID reader/writer in accordance with at least one embodiment of the invention is illustrated. The system 110 comprises a plurality of modules including a bar code reader module 112, a memory module 114, a control module 116, a storage module 120, an RF writer module 122, an RF reader module 124, an indicator module 126, a communication module 128 and a user interface module 130. Each module may comprise a separate circuit, routine or application, may be based in hardware, in software, or both, may be firmware, may be discrete components of a modular system or merely subroutines/subcomponents of the same system, such as a single computer program stored in a memory structure of a device, such as a dual mode bar code scanner and RFID reader/writer device.

In various embodiments, a user will interact with the system 110 through the user interface module 130. This module may include a keyboard, mouse, stylus, biometric sensor, display screen or other interface that allows a user to interact with the system such as to input information, issue commands, power the device on an off, perform file management, upgrade software and database information, monitor output, receive feedback and perform other administrative and non-administrative tasks.

In various embodiments when a user issues a command to commence a scan-write operation through the user interface module 130, the control module 116, will cause the bar code reader module 112 to activate. The control module 116 may in various embodiments be a microprocessor, a digital signal processor (DSP), control system, virtual instrument, program kernel or other suitable command issuing structure. If the user has the bar code reader properly oriented with respect to a bar code, the bar code reader module 112 will return a code, such as a sequence of numbers, obtained from the reflection pattern generated by illuminating the bar code with the reader. In various embodiment, the bar code reader module 112 will store the code in the memory module 114. The memory module 114 may comprise volatile memory such as random access memory, non-volatile memory such as flash memory, storage such as computer hard drive, holographic storage device or other storage device, or mixtures of any of the above. In various embodiments, the control module 116 will then access the storage module 120 which, may contain a database of detailed product information that is indexed by the code read obtained by the barcode reader module 112. It should be appreciated that in various embodiments, the memory module 114 and storage module 120 may be consolidated into a single module. However, in other embodiments, the storage module 120 will be non-volatile storage and the memory module 114 will be temporary, volatile storage. In still further embodiments, the storage module 120 may be external to the control system 110. In such embodiments, the control module 116 may utilize the communications module 128 to access an external database in the storage module 120 that contains detailed product information. In such embodiments, the communication module 128 will query the remote database using the code stored in the memory module 114 that was acquired by the barcode reader module 112 and will return the detailed product information associated with that code. In various embodiments, this information will be also be stored in the memory module 114 in association with the code.

After the system 110 has obtained all available information, or at least the information fields selected by the user, the control module 116 may cause the RF writer module 122 to activate. The RF writer module will interrogate the memory module 114 to obtain the information to be written to the RFID transponder tag and transmit a signal through an antenna that contains the information intended to be programmed into the RFID transponder tag. In various embodiments, the user may, through the user interface module 130, select a particular operating frequency for the RF writer module 122 to transmit on. In other embodiments, the RF writer module 122 may transmit through a plurality of different frequencies known to be compatible with various different types of RFID transponder tags. In still further embodiments, the user may, through the user interface module 130, select a particular brand, type or model of RFID transponder tag, which, in turn will cause the RF writer module 122 to select a particular frequency for transmitting the signal to the RFID transponder tag.

After the writer module 122 has finished, in various embodiments, the control module 116 may cause the RF reader module 124 to perform a read operation by generating an RF field of sufficient strength and appropriate frequency to read the data contained in the RFID transponder tag. The data obtained by the RF reader module 124 may be temporarily stored in the memory module 114. The control module 116 may then compare this information to the information that was written to the tag by the RF writer module 122 to determine whether the write operation was successful. The control module 116 may engage the indicator module 126 based on the results of this determination. For example, if the read and written data in the memory module 114 matches, the control module 116 may cause the indicator module 126 to issue a positive indication to the user, such as green light, sound, text message, voice, or other indication, or combinations of any of the above. Alternatively, if the read and written data in the memory module 114 is not the same, or if no data was obtained during the read operation, the control module 116 may cause the indicator module 126 to issue a negative indication to the user, such as a red light, sound, voice, text message or other indication, or combinations of any of the above. In various embodiments, if the data in the memory module 114 is not the same, the control module 116 may automatically, that is without user intervention, engage the RF writer module 122 to again write the information stored in the memory module 114 to the RFID tag. Alternatively, the control module 116 may cause a message to be displayed on the interface module 130 prompting the user to enter a command to re-initiate the write process or completely repeat the process starting with the bar code scan.

The embodiments of the present inventions are not to be limited in scope by the specific embodiments described herein. For example, although many of the embodiments disclosed herein have been described with reference to reading bar code labels and then writing information associated with the bar code label to an RFID transponder tag using a dual bar code reader and RFID reader/writer device, the principles herein are equally applicable to other aspects radio frequency-based identification. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed:

1. A method of programming an RFID tag, the method comprising:
   storing item information in a memory structure, the item information including:
      a bar code identifier; and
      one or more data fields associated with the bar code identifier;
   reading a bar code label with a bar code reader, wherein reading the bar code label includes:
      generating a reflection pattern by illuminating the bar code label with a light beam from the bar code reader; and
      converting the reflection pattern into a bar code identifier;
   using the bar code identifier to retrieve the one or more data fields from the memory structure;
   allowing a user to select whether or which of the one or more data fields are to be transmitted to the RFID tag;
   transmitting a radio frequency (RF) signal to the RFID tag, the RF signal including at least the selected one or more data fields; and
   storing at least the selected one or more data fields contained in the RF signal in a memory device in the RFID tag,
   wherein the memory structure is external to the bar code reader and the RFID tag.

2. The method according to claim 1, wherein the steps of reading and transmitting are performed with the same device.

3. The method according to claim 1, wherein transmitting the RF signal to the RFID tag comprises automatically transmitting upon successfully reading a bar code label.

4. The method according to claim 1, further comprising:
   after storing at least the selected one or more data fields in the memory device in the RFID tag, performing a read operation on the RFID tag to confirm that the stored fields have been successfully written to the RFID tag's memory.

5. The method according to claim 4, further comprising:
   providing an indication of whether the selected one or more data fields were successfully written to the tag.

6. The method according to claim 5, wherein the indication provided is selected from the group consisting of: a visual indication, a text alert, an audible indication, and combinations thereof.

7. A method of programming an RFID tag, the method comprising:
   storing information in a computing device, wherein the information stored in the computing device includes:
      identification information; and
      one or more data fields associated with the identification information;
   scanning a bar code with the computing device to obtain encoded information;
   allowing a user to select whether or which of the one or more data fields are to be transmitted to the RFID tag;
   using the obtained encoded information to retrieve at least the selected one or more of the data fields stored in the computing device;
   transmitting an RF signal from the computing device to the RFID tag, the RF signal containing at least the selected one or more data fields; and
   storing the information transmitted to the RFID tag in a memory structure in the RFID tag.

8. The method according to claim 7, wherein the computing device is a handheld combination barcode reader and RFID reader/writer device.

9. The method according to claim 7, wherein the encoded information obtained from scanning the bar code is used to match to the identification information stored in the computing device in order to retrieve at least the selected one or more data fields.

10. The method according to claim 7, wherein transmitting the RF signal containing at least the selected one or more data fields comprises automatically sending the RF signal to the RFID tag upon successfully reading the bar code label.

11. The method according to claim 7, further comprising:
    after storing the information transmitted to the RFID tag in the memory structure in the RFID tag, performing a read operation on the RFID tag to confirm that at least some of the transmitted information has been successfully written to the memory structure in the RFID tag.

12. The method according to claim 11, further comprising:
    providing an indication of whether the information transmitted to the RFID tag was successfully written to the RFID tag.

13. The method according to claim 12, wherein the indication provided is selected from the group consisting of: a visual indication, a text indication, an audible indication, and combinations thereof.

14. A system for programming RFID tags, the system comprising:
    a dual purpose bar code scanner and RFID reader/writer device; and
    a series of computer readable instructions stored in the dual purpose device adapted to cause the device to:
       activate a bar scanner operable to scan a bar code label to obtain a bar code input from the bar code label;
       store the bar code input; and
       transmit an RF write signal containing the bar code input and additional information;

wherein the additional information is determined by allowing a user to select whether or which of one or more data fields are to be transmitted with the bar code input, and wherein the series of computer readable instructions are further adapted to cause the device to query a database of product information that is indexed by the bar code input, to retrieve at least a portion of the product information as additional information, and to transmit an RF write signal containing the additional information along with the bar code input to an RFID transponder tag.

15. The system according to claim 14, wherein the series of computer readable instructions further comprise instructions adapted to cause the device to transmit an RF read signal to an RFID transponder tag to confirm that the bar code input was successfully written to the tag.

16. The system according to claim 15, wherein the series of computer readable instructions further comprise instructions adapted to cause the device to activate an indicator indicating whether the bar code input was successfully written to the tag.

17. The system according to claim 16, wherein the indicator is selected from the group consisting of: a visual indicator, a textual indicator, an audible indicator, and combinations thereof.

18. An apparatus for programming an RFID tag, the apparatus including:
　a storing unit configured to store information, wherein the information stored includes:
　　identification information; and
　　one or more data fields associated with the identification information;
　a scanning unit configured to scan a bar code to obtain encoded information;
　a selection unit configured to allow a user to select whether or which of the one or more data fields are to be transmitted to the RFID tag;
　a retrieval unit configured to use the obtained encoded information to retrieve at least the selected one or more of the data fields; and
　a transmitting unit configured to transmit an RF signal to the RFID tag, the RF signal containing at least the selected one or more data fields.

19. An apparatus for programming an RFID tag, the apparatus including:
　storing means for storing information, wherein the information stored includes:
　　identification information; and
　　one or more data fields associated with the identification information;
　scanning means for scanning a bar code to obtain encoded information;
　selecting means for allowing a user to select whether or which of the one or more data fields are to be transmitted to the RFID tag;
　retrieval means for using the obtained encoded information to retrieve at least the selected one or more of the data fields; and
　transmitting means for transmitting an RF signal to the RFID tag, the RF signal containing at least the selected one or more data fields.

20. A system for programming an RFID tag, the system comprising:
　storing means for storing item information in a memory structure, the item information including:
　　a bar code identifier; and
　　one or more data fields associated with the bar code identifier;
　reading means for reading a bar code label with a bar code reader, wherein reading the bar code label includes:
　　generating a reflection pattern by illuminating the bar code label with a light beam from the bar code reader; and
　　converting the reflection pattern into a bar code identifier;
　retrieval means for using the bar code identifier to retrieve the one or more data fields from the memory structure;
　selecting means for allowing a user to select whether or which of the one or more data fields are to be transmitted to the RFID tag;
　transmitting means for transmitting a radio frequency (RF) signal to the RFID tag, the RF signal including at least the selected one or more data fields; and
　storing means for storing at least the selected one or more data fields contained in the RF signal in a memory device in the RFID tag,
　wherein the memory structure is external to the bar code reader and the RFID tag.

* * * * *